Figure 1:
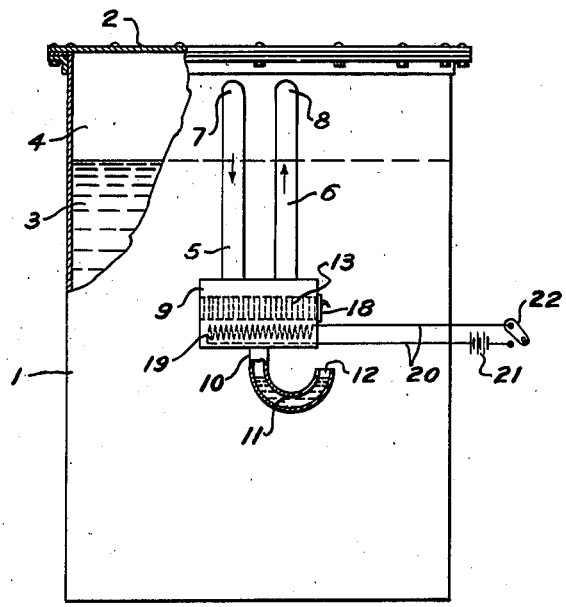

Oct. 13, 1925.

C. J. RODMAN 1,557,092

DEOXYGENATION OF INCLOSED ATMOSPHERE

Filed Dec. 23, 1922

WITNESSES:

INVENTOR
Clarence J. Rodman
BY
ATTORNEY

Patented Oct. 13, 1925.

1,557,092

UNITED STATES PATENT OFFICE.

CLARENCE J. RODMAN, OF WILKINSBURG, PENNSYLVANIA, ASSIGNOR TO WESTINGHOUSE ELECTRIC & MANUFACTURING COMPANY, A CORPORATION OF PENNSYLVANIA.

DEOXYGENATION OF INCLOSED ATMOSPHERE.

Application filed December 23, 1922. Serial No. 608,798.

*To all whom it may concern:*

Be it known that I, CLARENCE J. RODMAN, a citizen of the United States, and a resident of Wilkinsburg, in the county of Allegheny and State of Pennsylvania, have invented a new and useful Improvement in Deoxygenation of Inclosed Atmosphere, of which the following is a specification.

This invention relates to transformers, more particularly to means for providing an inert atmosphere in the space above the liquid level thereof.

It has been found that the presence of oxygen and water vapor in the space above the oil in various electrical apparatus, such as transformers, circuit breakers and the like, causes a reaction with the oil whereby sludging of the oil occurs, resulting in a deterioration of the dielectric properties thereof. Various attempts have been made to overcome this difficulty but none of the prior attempts have been completely successful under all conditions for various reasons.

The present invention is designed to overcome the difficulties encountered, it being among the objects thereof to provide a material for producing an inert atmosphere in electrical apparatus embodying a body of oil, which shall be not only adapted to remove oxygen and water vapor therefrom but to maintain said atmosphere in an inert condition.

When an active metal or alloy is brought into contact with oxygen in an atmosphere under suitable conditions, the metal or alloy is oxidized, thereby leaving an inert atmosphere consisting principally of nitrogen. I utilize this phenomenon to provide and maintain an inert atmosphere in a transformer tank or the like. Preferably, I utilize an active alloy consisting of magnesium and lead in finely divided form so placed in relation to the space above the oil in the apparatus as to be capable of removing oxygen and water vapor therefrom.

In the accompanying drawings, constituting a part hereof and in which like reference characters indicate like parts.

Figure 2:
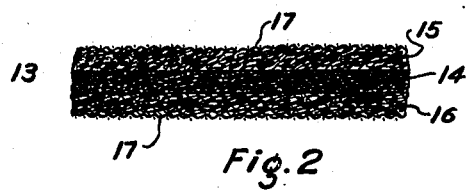

Fig. 1 is an elevational view of a transformer tank embodying my invention, some parts being broken away for clearness, and Fig. 2 is a fragmentary sectional view of the material constituting this invention.

A transformer tank 1 is provided with the usual cover 2 and is filled with an insulating oil 3, leaving a space 4 between the cover and the surface of the oil to allow of expansion of said oil. Tubes 5 and 6 opening into space 4 at points 7 and 8, respectively, are secured to container 9 having a breather pipe 10 of U-shape filled with mercury or other liquid 11. The open end 12 thereof communicates with the outside air.

Within the container 9 is the active material 13 which consists essentially of a layer 14 of finely divided active alloy intimately mixed with asbestos or other base material to provide a large surface area of said metal. Layers 15 and 16 of asbestos constitute protective surfaces for said active mixture 14. Layers of gauze 17 on the outside of the structure hold the layers 14, 15 and 16 in proper relation. The active mass 13 is inserted into container 9 through an opening closed by cover 18.

A heating element 19 in container 9 is placed in such relation to the active mass 13 as to be capable of heating the same to a proper temperature for initiating and accelerating the oxidizing reaction. Lead wires 20 from heating element 19 form a closed circuit with a source of current 21 and a switch 22.

In the operation of my device, when a transformer tank is filled with oil, the space 4 above the same includes oxygen and water vapor. Switch 22 is closed causing heater 19 to raise the temperature of active material 13 to such a temperature that the oxidizing reaction thereof is initiated and a circulation of gases in tubes 5 and 6 is started. Oxidation and dehydration proceeds rapidly so that, in a short time, the entire atmosphere 4 is inert and consists essentially of nitrogen. Switch 22 is then opened and heating of element 19 discontinued.

In the normal operation of the transformer, some breathing occurs through tube 10, thereby introducing more oxygen and water vapor into the system. In the presence of water vapor and oxygen, the active mass is capable of reacting with the same to form hydrates of the metals of the active alloy. Thus, in the normal breathing of the transformer, whatever oxygen and water vapor enters the container 9 is removed from the air, thereby maintaining the inert atmosphere in space 4.

It is desirable, in many instances, to provide a reducing atmosphere in the transformer and this may be accomplished very readily with my new material. Water vapor at ordinary temperatures will react with the active alloy of magnesium and lead or with either of said metals to form oxides thereof liberating hydrogen which provides a reducing atmosphere. This I accomplish by moistening the layers 15 and 16 of the active material 13, whereby, during the breathing or owing to the vapor tension at the operating temperatures, the vapor comes in contact with the active alloy and causes the reaction to proceed. Also, water vapor may be introduced in various other ways, as is readily apparent.

Although I have described a specific embodiment of my invention, it is obvious that my invention is not limited to the details shown and described. For instance, I am not limited to the structural features shown herein and claimed in my copending application, Serial No. 608,799, filed Dec. 23, 1922, but any other suitable system may be substituted therefor. Although I prefer to utilize a 20% magnesium—80% lead alloy, many other metals and alloys of a similar nature are adapted for my purpose. For instance, I may replace part or all of either or both metals by such metals as aluminum, zinc, iron or copper in finely divided form. Or such metals may be added to the above-specified active alloys. These and various other changes may be made in my invention within the scope thereof.

I claim as my invention:

1. Means for removing reactive gases and vapors from an atmosphere containing the same, which comprises a mixture of a metal capable of reacting with oxygen and an inert material, a protective coating over said mixture and means for holding said mixture and inert material in proper relation.

2. Means for removing reactive gases and vapors from an atmosphere containing the same, which comprises a mixture of an alloy capable of reacting with oxygen and an inert material, a protective coating over said mixture and means for holding said mixture and inert material in proper relation.

3. Means for removing reactive gases and vapors from an atmosphere containing the same, which comprises a mixture of a lead-magnesium alloy and asbestos fibres, said alloy containing about 20% magnesium and 80% lead, a protective coating of asbestos over said mixture and means for holding said mixture and inert material in proper relation.

4. Means for removing reactive gases and vapors from an atmosphere containing the same, comprising an easily oxidizable metal in finely divided form mixed with base material to provide a large surface area of said metal and a non-flammable material for providing a porous support for said mixture of metal and base material.

5. Means for removing reactive gases and vapors from an atmosphere containing the same, comprising an alloy capable of reacting with oxygen and water in finely divided form mixed with base material to provide a large surface area of said alloy and a non-flammable material for providing a porous support for said alloy and base material mixture.

6. Means for removing reactive gases and vapors from an atmosphere containing the same, comprising an easily oxidizable metal in finely divided form mixed with asbestos to provide a large surface area of said metal and a layer of porous non-flammable material thereon.

7. Means for removing reactive gases and vapors from an atmosphere containing the same, comprising an alloy capable of reacting with oxygen and water in finely divided form mixed with asbestos to provide a large surface area of said alloy and a layer of porous non-flammable material thereon.

8. Means for removing reactive gases and vapors from an atmosphere containing the same, comprising an easily oxidizable metal in finely divided form mixed with base material to provide a large surface area of said metal and a protective coating thereover.

9. Means for removing reactive gases and vapors from an atmosphere containing the same, comprising an alloy capable of reacting with oxygen and water in finely divided form mixed with base material to provide a large surface area of said alloy and a protective coating thereover.

10. Means for removing reactive gases and vapors from an atmosphere containing the same, comprising an alloy of magnesium and lead containing 20% magnesium and 80% lead, mixed with asbestos fibres and a protective coating of asbestos thereover.

In testimony whereof, I have hereunto subscribed my name this 22nd day of December, 1922.

CLARENCE J. RODMAN.